United States Patent
Morita

(10) Patent No.: US 9,698,886 B2
(45) Date of Patent: Jul. 4, 2017

(54) BASE STATION, COMMUNICATION CONTROL METHOD, AND PROCESSOR

(71) Applicant: KYOCERA CORPORATION, Kyoto (JP)

(72) Inventor: Kugo Morita, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 42 days.

(21) Appl. No.: 14/899,028

(22) PCT Filed: Jun. 12, 2014

(86) PCT No.: PCT/JP2014/065598
§ 371 (c)(1),
(2) Date: Dec. 16, 2015

(87) PCT Pub. No.: WO2014/208350
PCT Pub. Date: Dec. 31, 2014

(65) Prior Publication Data
US 2016/0127024 A1    May 5, 2016

(30) Foreign Application Priority Data

Jun. 25, 2013 (JP) ................ 2013-132463

(51) Int. Cl.
| | |
|---|---|
| H04B 7/06 | (2006.01) |
| H04B 7/10 | (2017.01) |
| H04W 16/28 | (2009.01) |
| H04W 24/10 | (2009.01) |
| H04B 7/0417 | (2017.01) |
| H04B 7/0452 | (2017.01) |

(Continued)

(52) U.S. Cl.
CPC ......... *H04B 7/0619* (2013.01); *H04B 7/0417* (2013.01); *H04B 7/0452* (2013.01); *H04B 7/0486* (2013.01); *H04B 7/063* (2013.01); *H04B 7/0617* (2013.01); *H04B 7/0626* (2013.01); *H04B 7/10* (2013.01); *H04W 16/28* (2013.01); *H04W 24/10* (2013.01); *H04W 88/08* (2013.01)

(58) Field of Classification Search
None
See application file for complete search history.

(56) References Cited

U.S. PATENT DOCUMENTS

| | | | | |
|---|---|---|---|---|
| 7,570,211 B1* | 8/2009 | Jensen | ................. | H01Q 3/2611 342/372 |
| 8,660,497 B1* | 2/2014 | Zhang | ................. | H04B 7/0452 370/252 |
| 2011/0310827 A1* | 12/2011 | Srinivasa | ............. | H04B 7/0434 370/329 |

OTHER PUBLICATIONS

International Search Report; issued in PCT/JP2014/065598; mailed Jul. 22, 2014.

(Continued)

*Primary Examiner* — Brian Roberts
(74) *Attorney, Agent, or Firm* — Studebaker & Brackett PC

(57) ABSTRACT

In a mobile communication system that supports downlink multi-antenna transmission, a base station managing a cell receives beamforming control information fed back from each of a plurality of beamforming target terminals connected to the cell, and null steering control information fed back from a null steering target terminal. When there exists no beamforming target terminal that feeds back the beamforming control information that coincides with the null steering control information, the base station selects, as a pair terminal, a beamforming target terminal that feeds back the beamforming control information containing a predefined rank indicator.

5 Claims, 9 Drawing Sheets

(51) Int. Cl.
*H04B 7/04* (2017.01)
*H04W 88/08* (2009.01)

(56) References Cited

OTHER PUBLICATIONS

Written Opinion; issued in PCT/JP2014/065598; mailed Jul. 22, 2014.
3GPP TS 36.300 V11.5.0 (Mar. 2013), 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11), 3GPP Organizational Partners, 2013.

\* cited by examiner

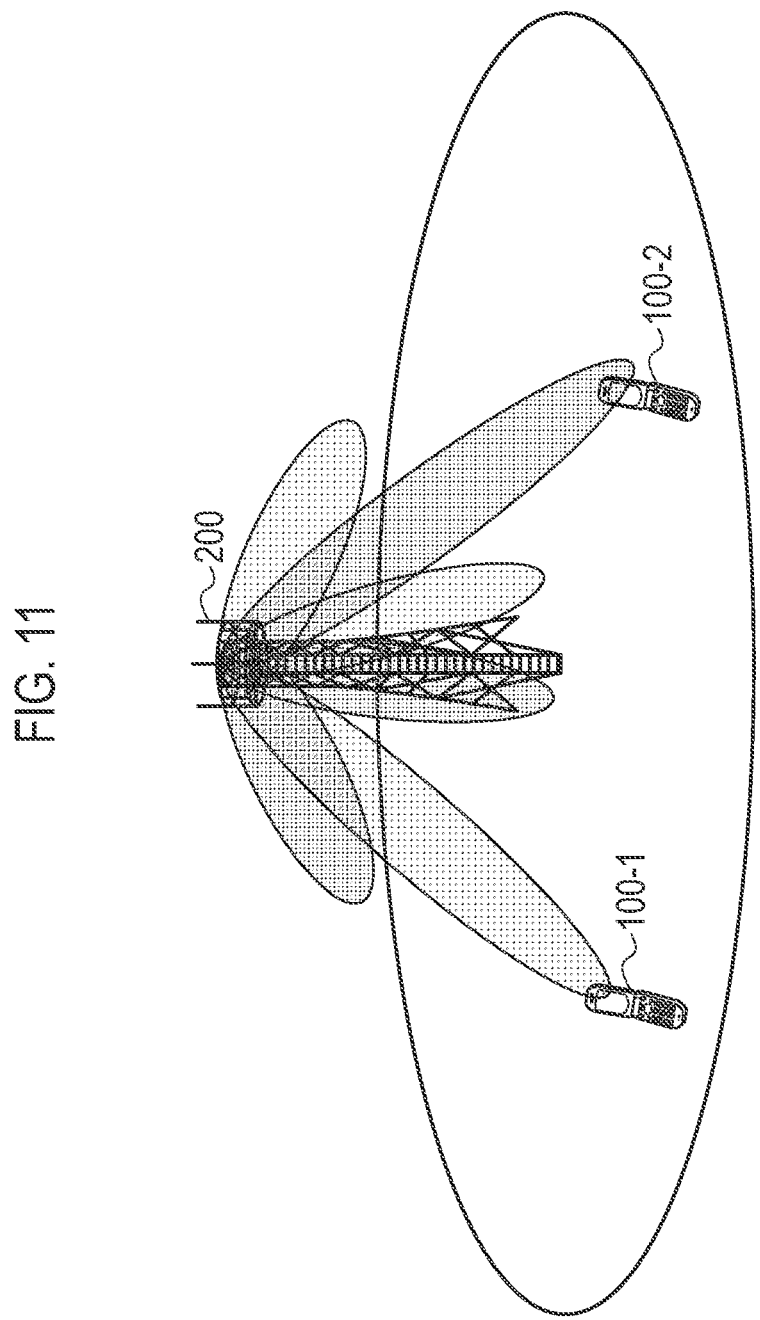

BASE STATION, COMMUNICATION CONTROL METHOD, AND PROCESSOR

TECHNICAL FIELD

The present invention relates to a base station, a communication control method, and a processor employed in a mobile communication system supporting downlink multi-antenna transmission.

BACKGROUND ART

The specifications of the Long Term Evolution (LTE) system have been specified in 3rd Generation Partnership Project (3GPP), which is a mobile communication system standardization project, and the LTE system supports downlink multi-antenna transmission (see Non patent Literature 1). For example, a base station performs beamforming, which directs a beam to one user terminal, while performing null steering, which directs a null to another user terminal. Thereby, the usage efficiency of radio resources is enhanced, while suppressing interference.

Coordinated Beamforming (CB)-Coordinated Multi Point (CoMP) is one mode of downlink multi-antenna transmission. In the CB-CoMP, a base station managing a cell receives: beamforming control information, which is fed back from each of a plurality of beamforming target terminals connected to the cell of the base station; and null steering control information, which is fed back from a null steering target terminal connected to a neighbor cell. The base station selects, as a pair terminal to be paired with the null steering target terminal, a beamforming target terminal feeding back beamforming control information that coincides with the null steering control information.

CITATION LIST

Non Patent Literature

Non patent Literature 1: 3GPP Technical Specification "TS36.300 V11.5.0," March 2013

SUMMARY OF INVENTION

However, when there exists no beamforming target terminal feeding back beamforming control information that coincides with null steering control information, the base station cannot select a pair terminal to be paired with the null steering target terminal. The problem of the foregoing case is that the downlink multi-antenna transmission cannot be effectively utilized.

Therefore, the object of the present invention is to provide the base station, the communication control method, and the processor that can effectively utilize the downlink multi-antenna transmission.

A base station according to a first aspect is a base station for managing a cell in a mobile communication system that supports downlink multi-antenna transmission. The base station includes: a receiver configured to receive beamforming control information fed back from each of a plurality of beamforming target terminals connected to the cell, and null steering control information fed back from a null steering target terminal; and a controller configured to select, as a pair terminal to be paired with the null steering target terminal, a beamforming target terminal that feeds back the beamforming control information that coincides with the null steering control information. The beamforming control information contains a rank indicator that indicates preferred number of signal sequences to be applied to the downlink multi-antenna transmission. When there exists no beamforming target terminal that feeds back the beamforming control information that coincides with the null steering control information, the controller selects, as the pair terminal, a beamforming target terminal that feeds back the beamforming control information containing a predefined rank indicator.

A communication control method according to a second aspect is used in a mobile communication system that supports downlink multi-antenna transmission. The communication control method includes the steps of: receiving, by a base station configured to manage a cell, beamforming control information fed back from each of a plurality of beamforming target terminals connected to the cell, and null steering control information fed back from a null steering target terminal; and selecting, by the base station, as a pair terminal to be paired with the null steering target terminal, a beamforming target terminal that feeds back the beamforming control information that coincides with the null steering control information. The beamforming control information contains a rank indicator that indicates preferred number of signal sequences to be applied to the downlink multi-antenna transmission. When there exists no beamforming target terminal feeding back the beamforming control information that coincides with the null steering control information, the base station selects in the selecting step, as the pair terminal, a beamforming target terminal that feeds back the beamforming control information containing a predefined rank indicator.

A processor according to a third aspect is provided in a base station for managing a cell in a mobile communication system that supports downlink multi-antenna transmission. The processor performs the processes of: receiving beamforming control information fed back from each of a plurality of beamforming target terminals connected to the cell, and null steering control information fed back from a null steering target terminal; and selecting, as a pair terminal to be paired with the null steering target terminal, a beamforming target terminal that feeds back the beamforming control information that coincides with the null steering control information. The beamforming control information contains a rank indicator that indicates preferred number of signal sequences to be applied to the downlink multi-antenna transmission. When there exists no beamforming target terminal feeding back the beamforming control information that coincides with the null steering control information, the processor selects in the selecting process, as the pair terminal, a beamforming target terminal that feeds back the beamforming control information containing a predefined rank indicator.

BRIEF DESCRIPTION OF DRAWINGS

FIG. 11 is a diagram illustrating MU-MIMO according to the modification of the embodiment.

DESCRIPTION OF EMBODIMENTS

Overview of Embodiments

Figure 1:
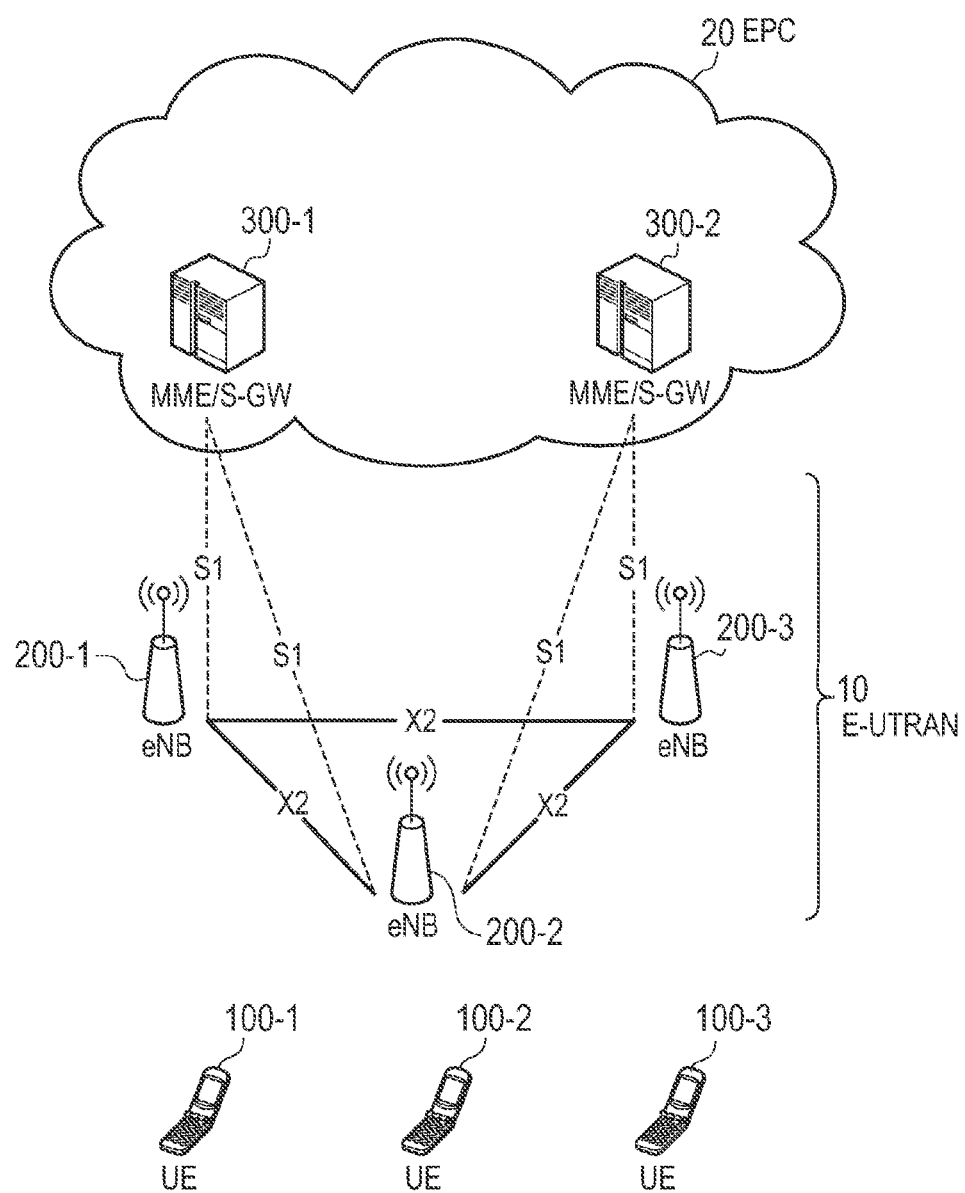
FIG. 1 is a diagram illustrating a configuration of an LTE system according to an embodiment.

A base station according to embodiments is a base station for managing a cell in a mobile communication system that supports downlink multi-antenna transmission. The base station includes: a receiver configured to receive beamforming control information fed back from each of a plurality of beamforming target terminals connected to the cell, and null steering control information fed back from a null steering target terminal; and a controller configured to select, as a pair terminal to be paired with the null steering target terminal, a beamforming target terminal that feeds back the beamforming control information that coincides with the null steering control information. The beamforming control information contains a rank indicator that indicates preferred number of signal sequences to be applied to the downlink multi-antenna transmission. When there exists no beamforming target terminal that feeds back the beamforming control information that coincides with the null steering control information, the controller selects, as the pair terminal, a beamforming target terminal that feeds back the beamforming control information containing a predefined rank indicator.

In the embodiments, the predefined rank indicator is a rank indicator that indicates a largest number of the signal sequences, from among a plurality of rank indicators available in the mobile communication system.

Alternatively, in the embodiments, the predefined rank indicator is a rank indicator having a smallest interfering level deviation, from among a plurality of rank indicators available in the mobile communication system, in a case where the rank indicator is combined with each of a plurality of precoder matrix indicators available in the mobile communication system.

A communication control method according to the embodiments is used in a mobile communication system that supports downlink multi-antenna transmission. The communication control method includes the steps of: receiving, by a base station configured to manage a cell, beamforming control information fed back from each of a plurality of beamforming target terminals connected to the cell, and null steering control information fed back from a null steering target terminal; and selecting, by the base station, as a pair terminal to be paired with the null steering target terminal, a beamforming target terminal that feeds back the beamforming control information that coincides with the null steering control information. The beamforming control information contains a rank indicator that indicates preferred number of signal sequences to be applied to the downlink multi-antenna transmission. When there exists no beamforming target terminal feeding back the beamforming control information that coincides with the null steering control information, the base station selects in the selecting step, as the pair terminal, a beamforming target terminal that feeds back the beamforming control information containing a predefined rank indicator.

A processor according to the embodiments is provided in a base station for managing a cell in a mobile communication system that supports downlink multi-antenna transmission. The processor performs the processes of: receiving beamforming control information fed back from each of a plurality of beamforming target terminals connected to the cell, and null steering control information fed back from a null steering target terminal; and selecting, as a pair terminal to be paired with the null steering target terminal, a beamforming target terminal that feeds back the beamforming control information that coincides with the null steering control information. The beamforming control information contains a rank indicator that indicates preferred number of signal sequences to be applied to the downlink multi-antenna transmission. When there exists no beamforming target terminal feeding back the beamforming control information that coincides with the null steering control information, the processor selects in the selecting process, as the pair terminal, a beamforming target terminal that feeds back the beamforming control information containing a predefined rank indicator.

Embodiment

An embodiment of applying the present invention to the LTE system will be described below.

(System Configuration)

FIG. 1 is a configuration diagram of an LTE system according to an embodiment. As illustrated in FIG. 1, the LTE system includes a plurality of UEs (User Equipments) 100, E-UTRAN (Evolved-UMTS Terrestrial Radio Access Network) 10, and EPC (Evolved Packet Core) 20.

The UE 100 corresponds to a user terminal. The UE 100 is a mobile communication device and performs radio communication with a cell (a serving cell) with which a connection is established. Configuration of the UE 100 will be described later.

The E-UTRAN 10 corresponds to a radio access network. The E-UTRAN 10 includes a plurality of eNBs (evolved Node-Bs) 200. The eNB 200 corresponds to a base station. The eNBs 200 are connected mutually via an X2 interface. Configuration of the eNB 200 will be described later.

The eNB 200 manages one or a plurality of cells and performs radio communication with the UE 100 which establishes a connection with the cell of the eNB 200. The eNB 200 has a radio resource management (RRM) function, a routing function for user data, and a measurement control function for mobility control and scheduling, and the like. It is noted that the "cell" is used as a term indicating a minimum unit of a radio communication area, and is also used as a term indicating a function of performing radio communication with the UE 100.

The EPC 20 corresponds to a core network. The EPC 20 includes a plurality of MME (Mobility Management Entity)/S-GWs (Serving-Gateways) 300. The MME performs various mobility controls and the like for the UE 100. The S-GW performs control to transfer user. MME/S-GW 300 is connected to eNB 200 via an S1 interface.

Figure 2:
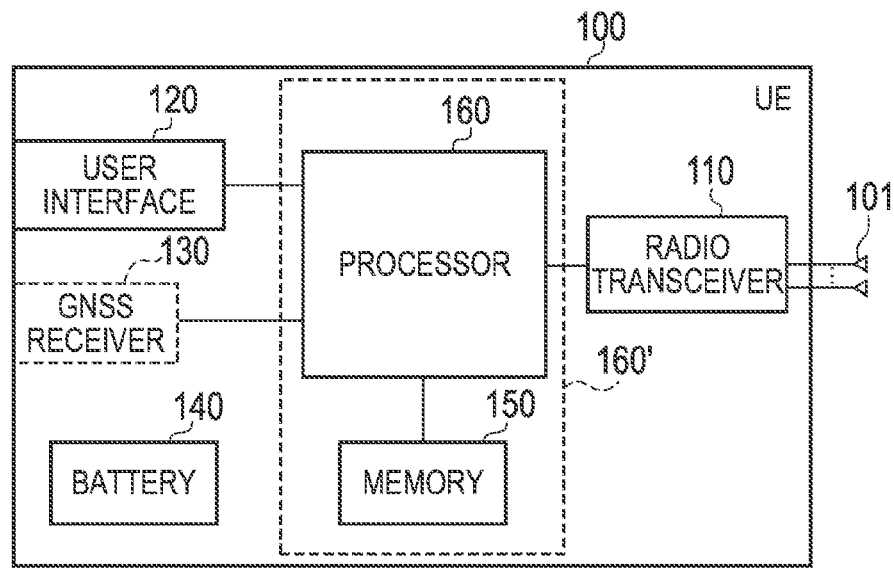
FIG. 2 is a block diagram of UE according to the embodiment.

FIG. 2 is a block diagram of the UE 100. As illustrated in FIG. 2, the UE 100 includes plural antennas 101, a radio transceiver 110, a user interface 120, a GNSS (Global Navigation Satellite System) receiver 130, a battery 140, a memory 150, and a processor 160. The memory 150 and the processor 160 constitute a controller. The UE 100 may not have the GNSS receiver 130. Furthermore, the memory 150 may be integrally formed with the processor 160, and this set (that is, a chip set) may be called a processor 160'.

The plural antennas 101 and the radio transceiver 110 are used to transmit and receive a radio signal. The radio transceiver 110 converts a baseband signal (a transmission signal) output from the processor 160 into the radio signal and transmits the radio signal from the antenna 101. Furthermore, the radio transceiver 110 converts a radio signal received by the antenna 101 into a baseband signal (a received signal), and outputs the baseband signal to the processor 160.

The user interface 120 is an interface with a user carrying the UE 100, and includes, for example, a display, a microphone, a speaker, various buttons and the like. The user interface 120 accepts an operation from a user and outputs a signal indicating the content of the operation to the processor 160. The GNSS receiver 130 receives a GNSS signal in order to obtain location information indicating a geographical location of the UE 100, and outputs the received signal to the processor 160. The battery 140 accumulates power to be supplied to each block of the UE 100.

The memory 150 stores a program to be executed by the processor 160 and information to be used for a process by the processor 160. The processor 160 includes a baseband processor that performs modulation and demodulation, encoding and decoding and the like on the baseband signal, and CPU (Central Processing Unit) that performs various processes by executing the program stored in the memory 150. The processor 160 may further include a codec that performs encoding and decoding on sound and video signals. The processor 160 executes various processes and various communication protocols described later.

Figure 3:
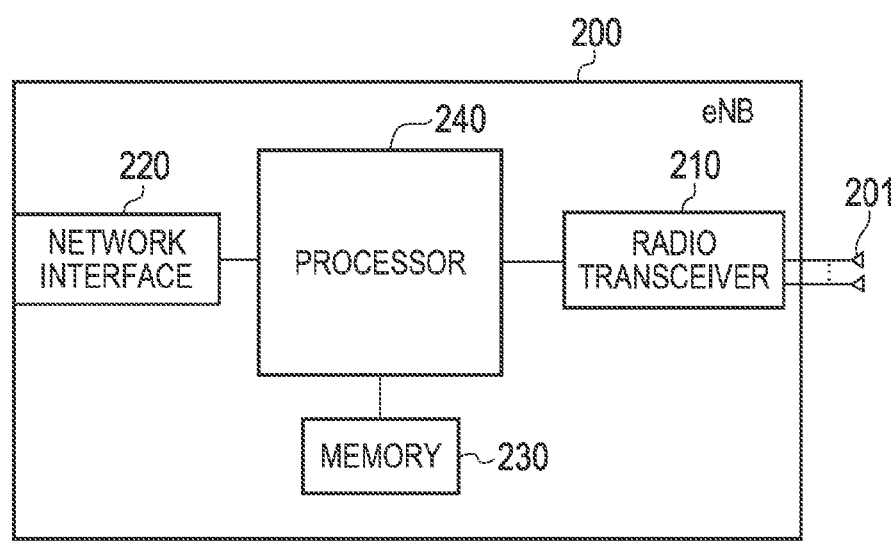
FIG. 3 is a block diagram of eNB according to the embodiment.

FIG. 3 is a block diagram of the eNB 200. As illustrated in FIG. 3, the eNB 200 includes plural antennas 201, a radio transceiver 210, a network interface 220, a memory 230, and a processor 240. The memory 230 and the processor 240 constitute a controller.

The plural antennas 201 and the radio transceiver 210 are used to transmit and receive a radio signal. The radio transceiver 210 converts a baseband signal (a transmission signal) output from the processor 240 into the radio signal and transmits the radio signal from the antenna 201. Furthermore, the radio transceiver 210 converts a radio signal received by the antenna 201 into a baseband signal (a received signal), and outputs the baseband signal to the processor 240.

The network interface 220 is connected to the neighboring eNB 200 via the X2 interface and is connected to the MME/S-GW 300 via the S1 interface. The network interface 220 is used in communication over the X2 interface and communication over the S1 interface.

The memory 230 stores a program to be executed by the processor 240 and information to be used for a process by the processor 240. The processor 240 includes a baseband processor that performs modulation and demodulation, encoding and decoding and the like on the baseband signal and CPU that performs various processes by executing the program stored in the memory 230. The processor 240 executes various processes and various communication protocols described later.

Figure 4:
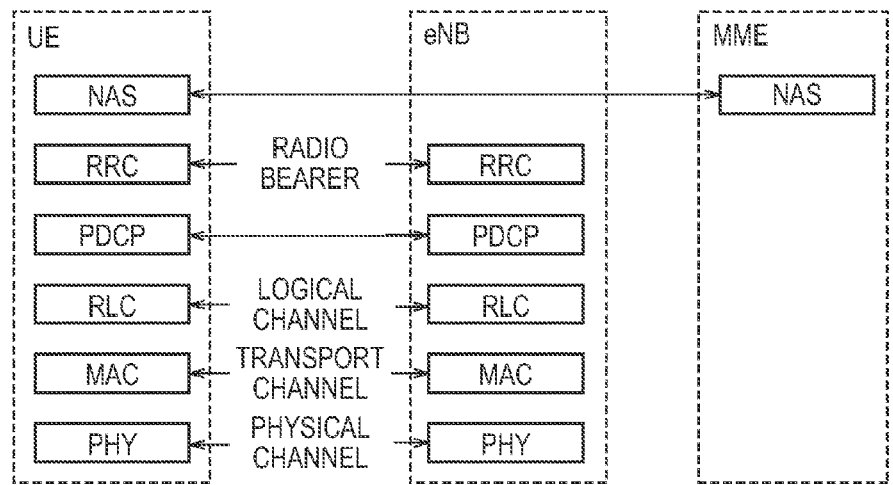
FIG. 4 is a protocol stack diagram of a radio interface according to the embodiment.

FIG. 4 is a protocol stack diagram of a radio interface in the LTE system. As illustrated in FIG. 4, the radio interface protocol is classified into a layer 1 to a layer 3 of an OSI reference model, wherein the layer 1 is a physical (PHY) layer. The layer 2 includes a MAC (Media Access Control) layer, an RLC (Radio Link Control) layer, and a PDCP (Packet Data Convergence Protocol) layer. The layer 3 includes an RRC (Radio Resource Control) layer.

The PHY layer performs encoding and decoding, modulation and demodulation, antenna mapping and demapping, and resource mapping and demapping. The PHY layer of the eNB 200 applies a precoder matrix (transmission antenna weight) and a rank (number of signal sequences) to perform downlink multi-antenna transmission. The downlink multi-antenna transmission according to the embodiment will be described later. Between the PHY layer of the UE 100 and the PHY layer of the eNB 200, use data and control signal are transmitted via the physical channel.

The MAC layer performs priority control of data, a retransmission process by hybrid ARQ (HARQ), and the like. Between the MAC layer of the UE 100 and the MAC layer of the eNB 200, user data and control signal are transmitted via a transport channel. The MAC layer of the eNB 200 includes a scheduler that determines a transport format of an uplink and a downlink (a transport block size and a modulation and coding scheme (MCS)) and a resource block to be assigned to the UE 100.

The RLC layer transmits data to an RLC layer of a reception side by using the functions of the MAC layer and the PHY layer. Between the RLC layer of the UE 100 and the RLC layer of the eNB 200, user data and control signal are transmitted via a logical channel.

The PDCP layer performs header compression and decompression, and encryption and decryption.

The RRC layer is defined only in a control plane dealing with control signal. Between the RRC layer of the UE 100 and the RRC layer of the eNB 200, control message (RRC messages) for various types of configuration are transmitted. The RRC layer controls the logical channel, the transport channel, and the physical channel in response to establishment, re-establishment, and release of a radio bearer. When there is an RRC connection between the RRC of the UE 100 and the RRC of the eNB 200, the UE 100 is in a connected state (an RRC connected state), otherwise the UE 100 is in an idle state (an RRC idle state).

A NAS (Non-Access Stratum) layer positioned above the RRC layer performs a session management, a mobility management and the like.

Figure 5:
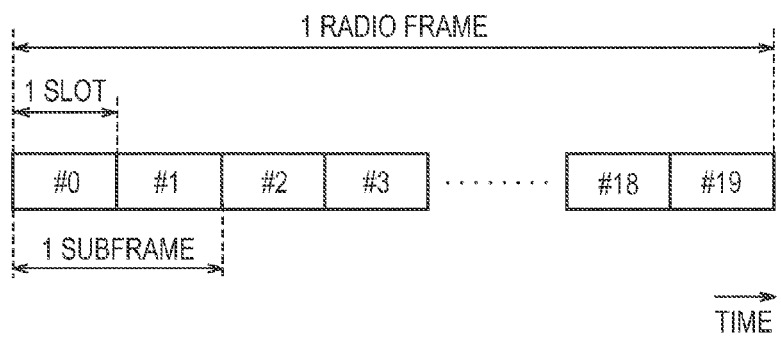
FIG. 5 is a diagram illustrating a configuration of a radio frame according to the embodiment.

FIG. 5 is a configuration diagram of a radio frame used in the LTE system. In the LTE system, OFDMA (Orthogonal Frequency Division Multiplexing Access) is applied to a downlink, and SC-FDMA (Single Carrier Frequency Division Multiple Access) is applied to an uplink, respectively.

As illustrated in FIG. 5, the radio frame is configured by 10 subframes arranged in a time direction, wherein each subframe is configured by two slots arranged in the time direction. Each subframe has a length of 1 ms and each slot has a length of 0.5 ms. Each subframe includes a plurality of resource blocks (RBs) in a frequency direction, and a plurality of symbols in the time direction. The resource block includes a plurality of subcarriers in the frequency direction. Among radio resources assigned to the UE 100, a frequency resource can be specified by a resource block and a time resource can be specified by a subframe (or slot).

In the downlink, an interval of several symbols at the head of each subframe is a control region used as a physical downlink control channel (PDCCH) for mainly transmitting a control signal. Furthermore, the other interval of each subframe is a region available as a physical downlink shared channel (PDSCH) for mainly transmitting user data.

In the uplink, both ends in the frequency direction of each subframe are control regions used as a physical uplink control channel (PUCCH) for mainly transmitting a control signal. Furthermore, the central portion in the frequency direction of each subframe is a region available as a physical uplink shared channel (PUSCH) for mainly transmitting user data.

Operation According to Embodiment (1) CB-CoMP

The LTE system according to the embodiment supports CB-CoMP, which is one mode of downlink multi-antenna transmission. In the CB-CoMP, a plurality of eNB 200 cooperate to perform beamforming and null steering.

Figure 6:
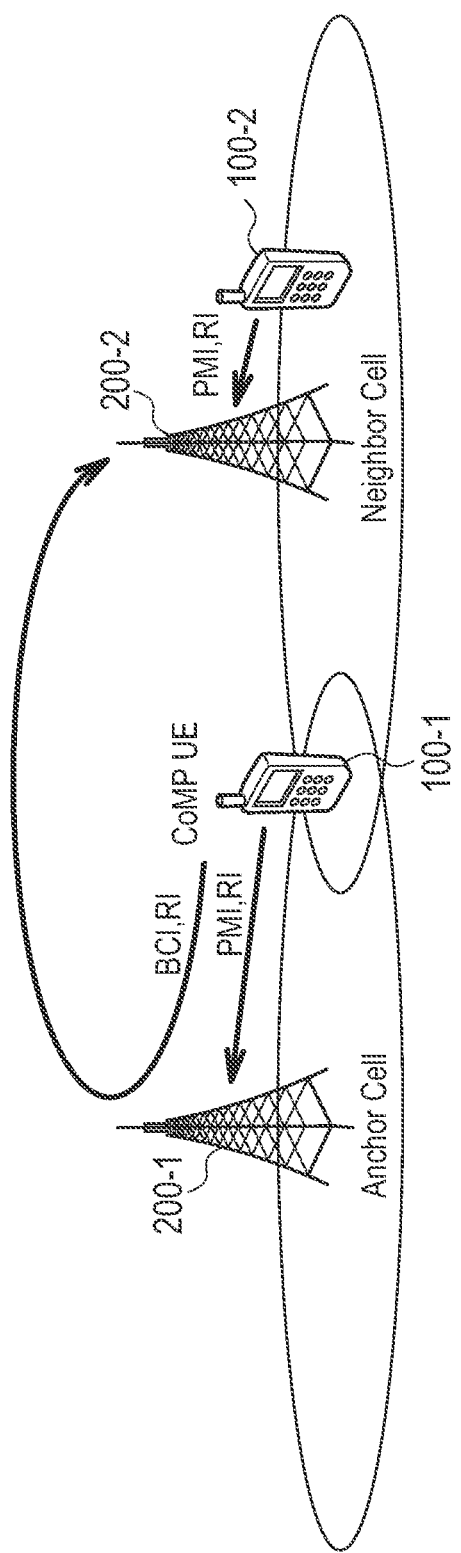
FIG. 6 is a diagram illustrating CB-CoMP according to the embodiment.
Figure 7:
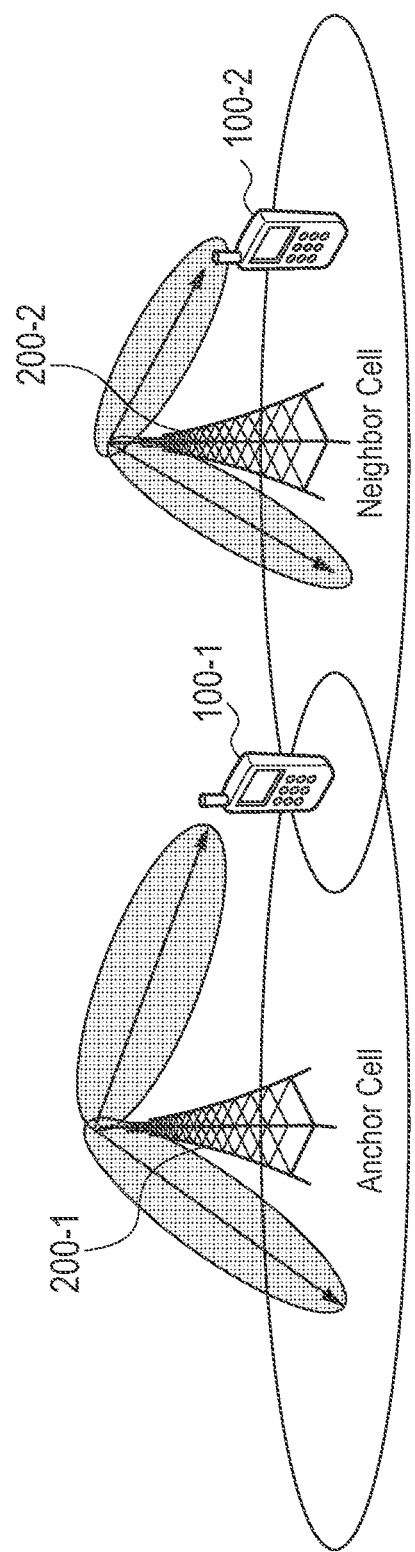
FIG. 7 is a diagram illustrating CB-CoMP according to the embodiment.

FIGS. 6 and 7 are diagrams illustrating CB-CoMP. As illustrated in FIG. 6, eNB 200-1 and eNB 200-2 manage cells neighboring with each other. Also, the cells of eNB 200-1 and eNB 200-2 belong to the same frequency.

UE 100-1 is in a state of having established connection with the cell of eNB 200-1 (connection state). Specifically, the UE 100-1 uses the cell of the eNB 200-1 as a serving cell to perform communication.

In contrast, the UE 100-2 is in a state of having established connection with the cell of the eNB 200-2 (connection state). Specifically, UE 100-2 uses the cell of eNB 200-2 as a serving cell to perform communication. FIG. 6 illustrates only one UE 100-2 that establishes connection with the cell of the eNB 200-2. However, in an actual environment, a plurality of UEs 100-2 establish connection with the cell of the eNB 200-2.

The UE 100-1 is located in a boundary region between the cells of the eNB 200-1 and the eNB 200-2. In this case, the UE 100-1 receives influence of interference by the cell of the eNB 200-2. The interference against UE 100-1 can be suppressed by applying CB-CoMP to the UE 100-1.

The CB-CoMP communication procedure in a case where the CB-CoMP is applied to the UE 100-1 is hereinafter described. The UE 100-1, to which the CB-CoMP is applied, may be referred to as "CoMP UE". Specifically, the UE 100-1 corresponds to a null steering target terminal. A serving cell of UE 100-1 (CoMP UE) may be referred to as "anchor cell".

Based on a reference signal received from serving cells, the UE 100-1 and the UE 100-2 each feed backs, to the serving cell, beamforming control information for directing a beam to the UE 100-1 and the UE 100-2, respectively. According to the embodiment, beamforming control information contains a precoder matrix indicator (PMI) and a rank indicator (RI). The PMI is an indicator that indicates a precoder matrix (transmission antenna weight) recommended for the serving cell. The RI is an indicator that indicates the rank (number of signal sequences) recommended for the serving cell. The UE 100-1 and the UE 100-2 each have a table (code book) for associating a precoder matrix and an indicator, and select a precoder matrix that enhances the communication quality of a desired wave. In turn, the UE 100-1 and the UE 100-2 each feed backs, as a PMI, an indicator corresponding to the selected precoder matrix.

Based on a reference signal received from a neighbor cell, the UE 100-1 also feeds back, to the serving cell, null steering control information for directing a null to the UE 100-1. According to the embodiment, null steering control information contains a Best Companion PMI (BCI) and a RI. The BCI is an indicator that indicates a precoder matrix (transmission antenna weight) recommended for a neighbor cell. UE 100-1 has a table (code book) for associating a precoder matrix and an indicator, and selects a precoder matrix that reduces the reception level of an interference wave or reduces an effect on a desired wave. Also, the UE 100-1 feeds back, as a BCI, an indicator corresponding to the selected precoder matrix.

The eNB 200-1 transfers, to the eNB 200-2, the null steering control information (BCI, RI) fed back from the UE 100-1.

The eNB 200-2 receives beamforming control information (PMI, RI) fed back from each of a plurality of the UEs 100-2 connected to the cell of the eNB 200-2, and null steering control information (BCI, RI) fed back from the UE 100-1 connected to a neighbor cell. Also, eNB 200-2 selects, as pair UE (pair terminal) to be paired with the UE 100-1, UE 100-2 feeding back beamforming control information that coincides with null steering control information. According to the embodiment, "null steering control information that coincides with beamforming control information" indicates beamforming control information containing a combination of PMI and RI that coincides with a combination of BCI and RI contained in null steering control information.

After selection of the pair UE (UE 100-2), the eNB 200-2 assigns, to the pair UE, a radio resource identical to a radio resource assigned to the UE 100-1. In turn, the eNB 200-2 applies the beamforming control information (PMI, RI) fed back from the pair UE in order to perform transmission to the pair UE. Consequently, as illustrated in FIG. 7, eNB 200-2 can direct a null to the UE 100-1 and perform transmission to the pair UE while directing a beam to the pair UE.

(2) Operation of eNB 200-2

(2.1) Operation Overview

As described above, the eNB 200-2 selects, as the pair UE to be paired with the UE 100-1, the UE 100-2 feeding back beamforming control information (PMI, RI) that coincides with null steering control information (BCI, RI) fed back from the UE 100-1. Here, the UE 100-1 corresponds to a null steering target terminal, and the UE 100-2 corresponds to a beamforming target terminal.

However, when there exists no UE 100-2 feeding back beamforming control information that coincides with null steering control information, eNB 200-2 cannot select pair UE to be paired with the UE 100-1 and cannot apply the CB-CoMP.

When there exists no UE 100-2 feeding back beamforming control information that coincides with null steering control information, the eNB 200-2 selects, as the pair UE, UE 100-2 feeding back beamforming control information containing a predefined RI.

According to the embodiment, a predefined RI is a RI that indicates the highest rank (number of signal sequences) from among the plurality of RIs available in the LTE system. In the LTE system, the rank is defined to range from 1 to 4. Specifically, multiple transmission is defined to be performed for signal sequences ranging from 1 signal sequence (RI=1) to 4 signal sequences (RI=4).

As the number of signal sequences for which multiple transmission is performed increases, the power density per signal sequence decreases. Therefore, the interference level at the UE 100-1 can be decreased even when a beam is directed to the UE 100-1 by applying a PMI that does not coincide with a BCI to perform transmission.

In other words, a predefined RI is a RI with the smallest given interference level deviation of the plurality from among RIs available in the LTE system when combined with each of a plurality of PMIs available in the LTE system.

Figure 8:
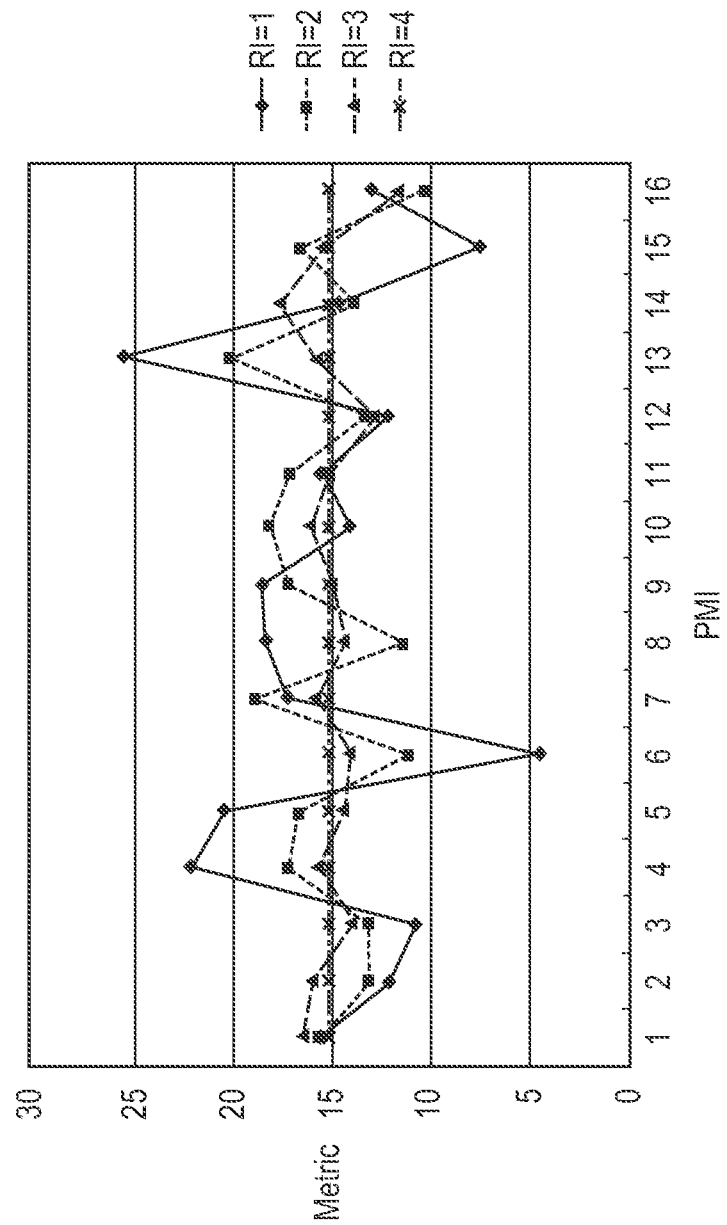
FIG. 8 is a diagram illustrating the relationship between beamforming control information and the interference level according to the embodiment.

FIG. 8 is a diagram illustrating the relationship between beamforming control information applied by the eNB 200-2 and the interference level at the UE 100-1. FIG. 8 illustrates the simulation result of applying beamforming control information that does not coincide with null steering control information fed back by the UE 100-1.

As illustrated in FIG. 8, the power density per signal sequence increases in the case of 1 signal sequence (RI=1). Thus, the interference level at the UE 100-1 significantly changes depending on the PMI applied by the eNB 200-2. Specifically, in the case of RI=1, the interfering level deviation is largest when the RI is combined with each of a plurality of PMIs (PMI=1 to 16) available in the LTE system.

In contrast, the power density per signal sequence decreases in the case of 4 signal sequences (RI=4). Thus, the interference level at the UE 100-1 changes little depending on the PMI applied by the eNB 200-2. Specifically, in the case of RI=4, the interfering level deviation is smallest when the RI is combined with each of a plurality of PMIs (PMI=1 to 16) available in the LTE system.

When the UE 100-1 applies beamforming control information that does not coincide with fed-back null steering control information, the interference level at the UE 100-1 can be decreased by applying beamforming control information containing RI=4.

(2.2) Operation Flow

Figure 9:
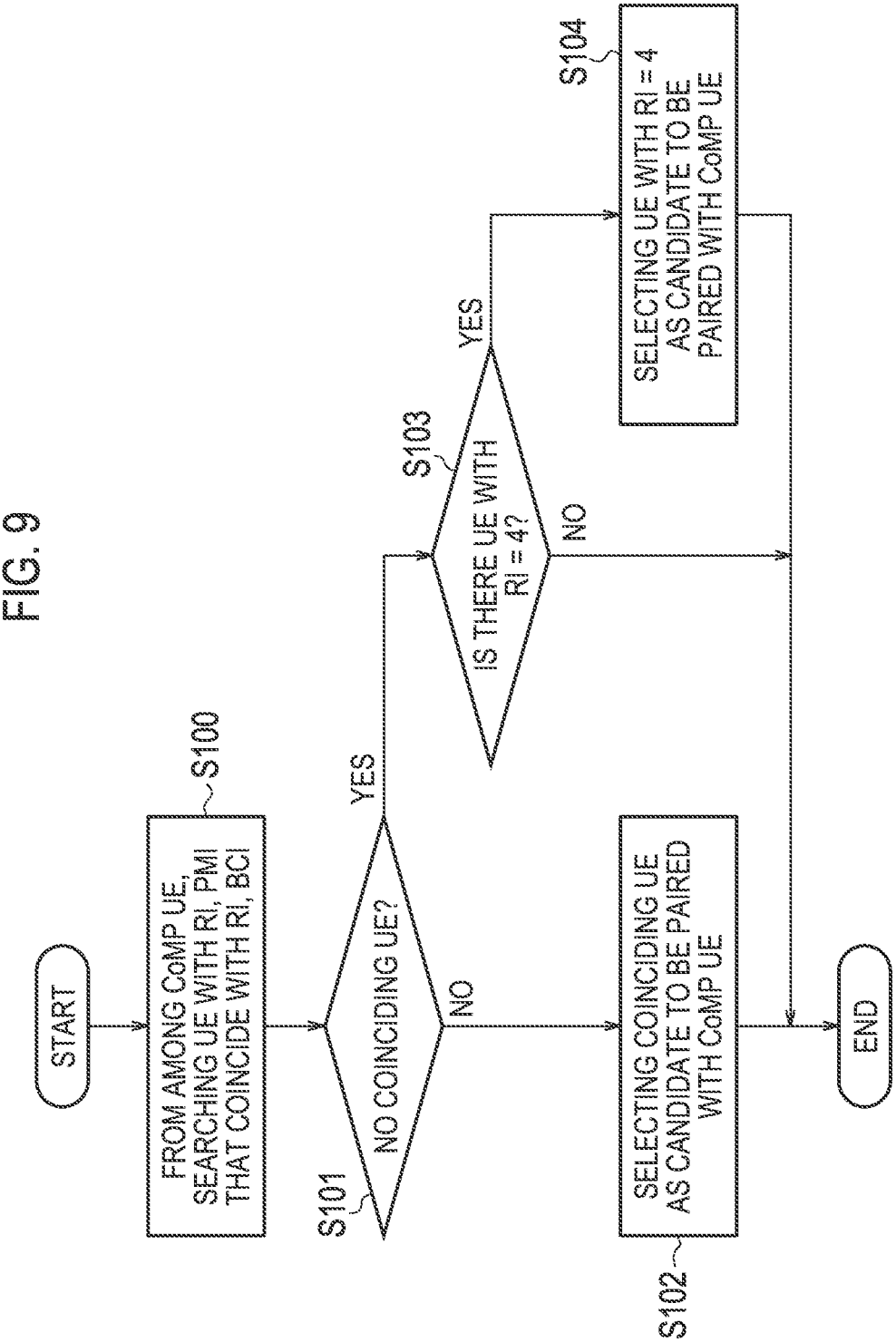
FIG. 9 is an operation flowchart of eNB according to the embodiment.

FIG. 9 is an operation flowchart of the eNB 200-2 according to the embodiment. Prior to performing the procedure of this flowchart, the radio transceiver 210 of eNB 200-2 has received beamforming control information (PMI, RI) fed back from each of a plurality of UEs 100-2 connected to the cell of eNB 200-2. The network interface 220 of eNB 200-2 receives, via eNB 200-1, null steering control information (BCI, RI) fed back from UE 100-1 (CoMP UE) connected to a neighbor cell. According to the embodiment, the radio transceiver 210 and the network interface 220 constitute a receiver that receives beamforming control information and null steering control information.

As illustrated in FIG. 9, in step S100, the processor 240 of eNB 200-2 searches UE 100-2 feeding back beamforming control information that coincides with null steering control information.

In step S101, the processor 240 of eNB 200-2 confirms whether there exists UE 100-2 feeding back beamforming control information that coincides with null steering control information.

When there exists UE 100-2 feeding back beamforming control information that coincides with null steering control information (step S101: NO), in step S102, the processor 240 of eNB 200-2 selects, as pair UE of UE 100-1 (CoMP UE), the UE 100-2 feeding back beamforming control information that coincides with null steering control information.

In contrast, when there exists no UE 100-2 feeding back beamforming control information that coincides with null steering control information (step S101: YES), in step S103, the processor 240 of eNB 200-2 confirms whether there exists UE 100-2 feeding back beamforming control information containing RI=4.

When there exists no UE 100-2 feeding back beamforming control information containing RI=4 (step S103: NO), the operation of CB-CoMP is halted as appropriate pair UE cannot be selected. For example, the eNB 200-2, in its own cell, does not assign a radio resource identical to a radio resource assigned to the UE 100-1 (CoMP UE).

In contrast, when there exists UE 100-2 feeding back beamforming control information containing RI=4 (step S103: YES), in step S104, the processor 240 of eNB 200-2 selects, as the pair UE of UE 100-1 (CoMP UE), UE 100-2 feeding back beamforming control information containing RI=4.

After selecting the pair UE (UE 100-2), the eNB 200-2 assigns, to the pair UE, a radio resource identical to a radio resource assigned to UE 100-1. In turn, eNB 200-2 applies beamforming control information (PMI, RI) fed back from the pair UE to perform transmission to the pair UE. Consequently, as illustrated in FIG. 7, the eNB 200-2 can direct a null to the UE 100-1 and perform transmission to the pair UE, while directing a beam to the pair UE.

Modification of Embodiment

The above-described embodiment illustrates one example of applying the present invention to CB-CoMP, which is one embodiment of downlink multi-antenna transmission. However, the present invention may be applied to Multi User (MU)-Multiple-Input and Multiple-Output (MIMO), which is another mode of downlink multi-antenna transmission. In a modification of the embodiment, a case of applying the present invention to MU-MIMO will be described.

Figure 10:
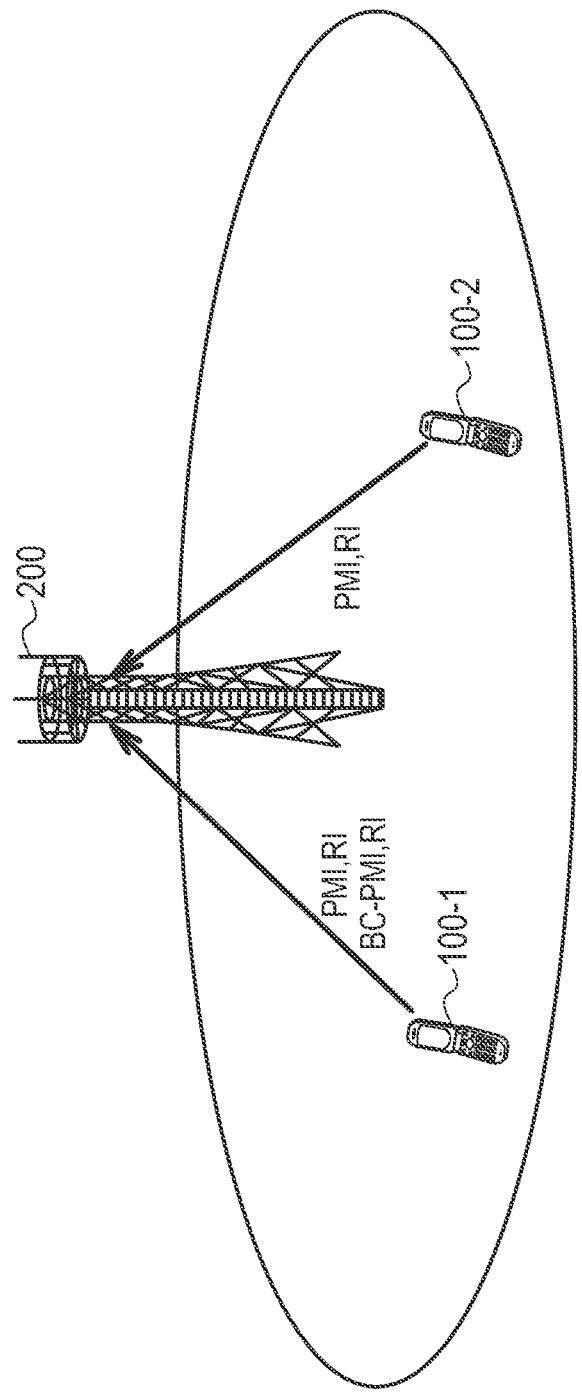
FIG. 10 is a diagram illustrating MU-MIMO according to a modification of the embodiment.

FIGS. 10 and 11 are diagrams illustrating MU-MIMO. As illustrated in FIG. 10, each of UE 100-1 and UE 100-2 is in a state of having established connection with the cell of eNB 200 (connection state). Specifically, each of the UE 100-1 and the UE 100-2 uses the cell of the eNB 200 as a serving cell in order to perform communication. FIG. 10 illustrates only two UEs 100 having established connection with the cell of the eNB 200. In an actual environment, at least three UEs 100 establish connection with the cell of the eNB 200.

Hereinafter, the communication procedure for applying MU-MIMO to the UE 100-1 will be described. Here, the UE 100-1 corresponds to a null steering target terminal, and UE 100-2 corresponds to a beamforming target terminal. It is note that the duplicated descriptions with the above embodiment will be omitted.

Based on a reference signal or the like received from serving cells, the UE 100-1 and the UE 100-2 each feed backs, to the serving cell, beamforming control information for directing a beam to the UE 100-1 and the UE 100-2, respectively. The beamforming control information contains PMI and RI.

Based on a reference signal or the like received from the serving cell, the UE 100-1 also feeds back, to the serving cell, null steering control information for directing a null to the UE 100-1. The null steering control information contains Best Companion PMI (BCI) and RI.

The eNB 200 receives beamforming control information (PMI, RI) fed back from each of a plurality of UEs 100-2 connected to the cell of the eNB 200, and null steering control information (BCI, RI) fed back from the UE 100-1 connected to the cell of the eNB 200. In turn, the eNB 200 selects, as a pair UE (pair terminal) to be paired with the UE 100-1, the UE 100-2 feeding back beamforming control information that coincides with null steering control information.

The eNB 200 selects pair UE (UE 100-2) and assigns, to the pair UE, a radio resource identical to a radio resource assigned to the UE 100-1. In turn, the eNB 200 applies the beamforming control information (PMI, RI) fed back from the pair UE in order to perform transmission to the pair UE. Consequently, as illustrated in FIG. 11, eNB 200 can direct a null to the UE 100-1 and perform transmission to the pair UE while directing a beam to the pair UE.

In this modification, the operation flow of the eNB 200 is identical to the operation flowchart of the above-described embodiment (see FIG. 9). Specifically, when there exists no UE 100-2 feeding back beamforming control information that coincides with null steering control information, the eNB 200 selects, as pair UE, UE 100-2 feeding back beamforming control information containing a predefined RI. The predefined RI is a RI that indicates the highest rank (number of signal sequences) from among the plurality of RIs available in the LTE system. In other words, the predefined RI is a RI with the smallest given interfering level deviation from among the plurality of RIs available in the LTE system when the RI is combined with each of a plurality of PMIs available in the LTE system.

Other Embodiments

According to the above embodiment, null steering control information transmitted by the UE 100-1 is fed back indirectly, via the eNB 200-1 to the eNB 200-2. However, direct feedback may be made to the eNB 200-2 by bypassing the eNB 200-1.

According to the above embodiment and the modification thereof, when there exists no UE 100-2 feeding back beamforming control information that coincides with null steering control information and when there exists no UE 100-2 feeding back beamforming control information containing RI=4, application of CB-CoMP is halted. Instead, it is possible to select, as pair UE, UE 100-2 feeding back beamforming control information containing RI=3.

According to the above embodiment and the modification thereof, a BCI is described as one example of null steering control information, but a Worst Companion PMI (WCI) may be used instead of a BCI. The WCI is an indicator that indicates a precoder matrix in which the interference level from the interference source increases. The eNB 200 receives beamforming control information (PMI, RI) fed back from each of a plurality of the UE 100-2, and null steering control information (WCI, RI) fed back from the UE 100-1. The eNB 200 selects, as pair UE (pair terminal) to be paired with the UE 100-1, UE 100-2 feeding back beamforming control information that coincides with null steering control information. In this case, the beamforming control information that coincides with null steering control information is beamforming control information containing PMI not identical to WCI contained in the null steering control information or containing RI identical to RI contained in the null steering control information.

In the above embodiments, the LTE system is described as one example of a cellular communication system. However, the present invention is not limited to the LTE system. The present invention may be applied to systems other than the LTE system.

The entire contents of Japanese patent application No. 2013-132463 (filed on Jun. 25, 2013) are incorporated herein by reference.

INDUSTRIAL APPLICABILITY

The present invention is useful in mobile communication fields.

The invention claimed is:

1. A base station for managing a cell in a mobile communication system that supports downlink multi-antenna transmission, comprising:
   a receiver configured to receive beamforming control information fed back from each of a plurality of beamforming target terminals connected to the cell, and null steering control information fed back from a null steering target terminal; and
   a controller configured to select, as a pair terminal to be paired with the null steering target terminal, a beamforming target terminal that feeds back the beamforming control information that coincides with the null steering control information, wherein
   the beamforming control information contains a rank indicator that indicates preferred number of signal sequences to be applied to the downlink multi-antenna transmission, and
   when there exists no beamforming target terminal that feeds back the beamforming control information that coincides with the null steering control information, the controller selects, as the pair terminal, a beamforming target terminal that feeds back the beamforming control information containing a predefined rank indicator.

2. The base station according to claim 1, wherein the predefined rank indicator is a rank indicator that indicates a largest number of the signal sequences, from among a plurality of rank indicators available in the mobile communication system.

3. The base station according to claim 1, wherein the predefined rank indicator is a rank indicator having a smallest interfering level deviation, from among a plurality of rank indicators available in the mobile communication system, in a case where the rank indicator is combined with each of a plurality of precoder matrix indicators available in the mobile communication system.

4. A communication control method used in a mobile communication system that supports downlink multi-antenna transmission, comprising the steps of:
   receiving, by a base station configured to manage a cell, beamforming control information fed back from each of a plurality of beamforming target terminals connected to the cell, and null steering control information fed back from a null steering target terminal; and
   selecting, by the base station, as a pair terminal to be paired with the null steering target terminal, a beamforming target terminal that feeds back the beamforming control information that coincides with the null steering control information, wherein
   the beamforming control information contains a rank indicator that indicates preferred number of signal sequences to be applied to the downlink multi-antenna transmission, and
   when there exists no beamforming target terminal feeding back the beamforming control information that coincides with the null steering control information, the base station selects in the selecting step, as the pair terminal, a beamforming target terminal that feeds back the beamforming control information containing a predefined rank indicator.

5. A processor provided in a base station for managing a cell in a mobile communication system that supports downlink multi-antenna transmission, the processor performing the processes of:
   receiving beamforming control information fed back from each of a plurality of beamforming target terminals connected to the cell, and null steering control information fed back from a null steering target terminal; and
   selecting, as a pair terminal to be paired with the null steering target terminal, a beamforming target terminal that feeds back the beamforming control information that coincides with the null steering control information, wherein the beamforming control information contains a rank indicator that indicates preferred number of signal sequences to be applied to the downlink multi-antenna transmission, and when there exists no beamforming target terminal feeding back the beamforming control information that coincides with the null steering control information, the processor selects in the selecting process, as the pair terminal, a beamforming target terminal that feeds back the beamforming control information containing a predefined rank indicator.

* * * * *